United States Patent
Nog et al.

(10) Patent No.: US 7,428,735 B2
(45) Date of Patent: Sep. 23, 2008

(54) EXTENSIBLE CONFIGURATION HANDLERS

(75) Inventors: Saurab Nog, Sammamish, WA (US);
Erik B. Christensen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 545 days.

(21) Appl. No.: 10/773,382

(22) Filed: Feb. 6, 2004

(65) Prior Publication Data
US 2005/0177711 A1    Aug. 11, 2005

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/320; 719/313; 709/217
(58) Field of Classification Search ......... 719/310–320, 719/328–332; 709/217–218
See application file for complete search history.

(56) References Cited

U.S. PATENT DOCUMENTS

| | | | |
|---|---|---|---|
| 6,246,404 B1 | | 6/2001 | Feigner et al. |
| 6,421,740 B1 | * | 7/2002 | LeCroy ...................... 719/331 |
| 6,466,943 B1 | | 10/2002 | Craig |
| 6,546,551 B1 | | 4/2003 | Sweeney et al. |
| 7,039,919 B1 | * | 5/2006 | Hunt .......................... 719/316 |
| 7,085,814 B1 | * | 8/2006 | Gandhi et al. ................ 709/208 |
| 7,117,504 B2 | * | 10/2006 | Smith et al. ................. 719/328 |
| 7,149,752 B2 | * | 12/2006 | Mangan ................... 707/103 R |
| 2003/0093471 A1 | * | 5/2003 | Upton ........................ 709/203 |
| 2003/0225870 A1 | * | 12/2003 | Sandadi et al. .............. 709/223 |
| 2005/0055680 A1 | * | 3/2005 | Kluger et al. ................ 717/143 |

OTHER PUBLICATIONS

Ying, et al,; "Formal Specification and Management of Multi-Layered Configuration File in Dynamic Distributed Systems"; Chinese Journal of Computers; vol. 22, No. 6; Jun. 1999; pp. 603-607.
Bellissard, et al., "Distributed Application Configuration"; Proceedings of the 16th International Conference on Distributed Computing Systems; IEEE Comput. Soc. Tech. Committee on Distributed Process; May 27-30, 1996; Hong Kong; pp. 579-585.

* cited by examiner

*Primary Examiner*—Meng-Ai An
*Assistant Examiner*—Diem K Cao
(74) *Attorney, Agent, or Firm*—Lee & Hayes, PLLC (57) ABSTRACT

In accordance with certain aspects of extensible configuration handlers, a method of using a configuration file to generate one or more components that are accessible to an application comprises a two-phase process. In a first phase, a plurality of components defined in a configuration file are created. In the second phase, one or more of the plurality of components are notified of the presence of the other components in the plurality of components. In accordance with certain other aspects of the extensible configuration handlers, the configuration handlers defined in a configuration file are nested configuration handlers.

19 Claims, 6 Drawing Sheets

EXTENSIBLE CONFIGURATION HANDLERS

TECHNICAL FIELD

This invention relates to configuration systems and files, and more particularly to extensible configuration handlers.

BACKGROUND

Today, computer programs are commonly written in what is referred to as a high-level computer language, such as C, C++, Visual Basic, and so forth. The computer program is then compiled into what is commonly referred to as source code, which can be executed or run by a computer. Computer programs are often distributed in this executable source code format, rather than requiring the end user to have the knowledge and resources to compile the high-level computer language into a form that can be run by a computer.

However, there are situations where it is desirable for an end user (e.g., a system administrator) to make changes to a computer program. For example, a particular program may include routing functionality, where the program receives messages from different devices or different components within the same device and forwards those messages to different devices or components based on a set of rules. It is oftentimes desirable to allow the system administrator or end user of the program to alter these routing rules, inserting their own rules and/or criteria for where particular messages should be forwarded. However, it can be very difficult and time-consuming to make such changes to compiled code.

One solution to allow such changes to compiled computer programs is the use of a configuration system. During execution or runtime of the computer program, a configuration system on the computer can be accessed to obtain custom information identified by the end user through a configuration file. The configuration system accesses the configuration file for the computer program, and creates appropriate objects based on the specified information in the configuration file. These objects can then be accessed by the computer program. Such objects would allow, for example, user-defined routing rules and/or criteria to be used by the compiled program.

However, certain problems exist in current configuration systems. For example, a configuration file could be written that includes new routing rules and/or criteria, but the format of those routing rules and/or criteria must be consistent—new formats for describing the routing rules and/or criteria cannot be defined. Another problem is that different components or objects generated by the configuration system are typically not aware of one another. So, new components could be created by the configuration system but they would not be able to make use of the functionality provided by one another because they do not know of one another's existence.

Extensible configuration handlers are described herein that solve these and other problems.

SUMMARY

Extensible configuration handlers are described herein.

In accordance with certain aspects of the extensible configuration handlers, a method of using a configuration file to generate one or more components that are accessible to an application comprises a two-phase process. In the first phase, a plurality of components defined in a configuration file are created. In the second phase, one or more of the plurality of components are notified of the presence of the other components in the plurality of components.

In accordance with certain aspects of the extensible configuration handlers, the configuration handlers defined in a configuration file are nested configuration handlers.

BRIEF DESCRIPTION OF THE DRAWINGS

The same numbers are used throughout the document to reference like components and/or features.

DETAILED DESCRIPTION

Extensible configuration handlers are described herein. The extensible configuration handlers defined within a configuration file allow for nested configuration handlers and/or notification of created objects or components of one another. By allowing nested configuration handlers, each configuration handler responsible for creating one or more objects or components can be further user-configured by addition of a user-defined child handler, and each such user-defined child handler can itself be further user-configured by addition of another user-defined child handler (this nesting of user-defined handlers can continue to any number of nested handlers). By allowing for notification of created objects or components of one another, components or objects created by an extensible configuration handler can be notified of all other components or objects created by that configuration handler as well as other configuration handlers. Each component or object can then use this information they are notified of as they desire (e.g., to access the functionality or services of one or more of the other components or objects).

Figure 1:
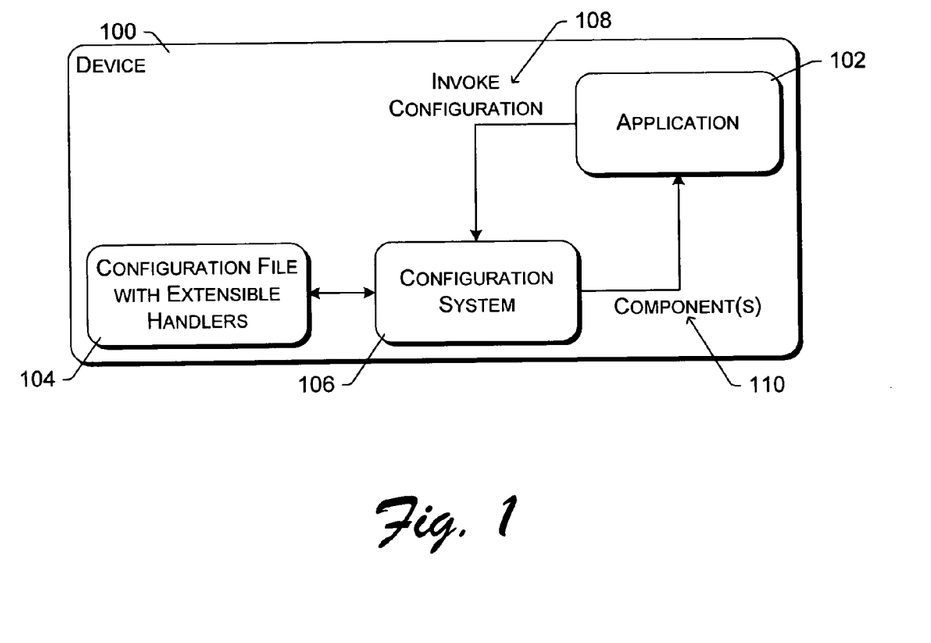
FIG. 1 is a block diagram illustrating an example device in which the extensible configuration handlers can be used.

FIG. 1 is a block diagram illustrating an example device 100 in which the extensible configuration handlers can be used. Device 100 represents any of a variety of computing devices, such as desktop computers, portable or handheld computers, gaming consoles, cellular telephones, and so forth. Device 100 is depicted during operation (during runtime), illustrating various components, modules, and files that are used during operation of the device.

During operation of device 100, an application 102 is running and reaches a point where it needs to access a component or object that is available from a configuration file 104 associated with application 102. Application 102 invokes 108 configuration system 106, which in turn accesses the appropriate configuration file 104 for application 102. Alternatively, rather than waiting until the application needs to access such a component or object, application 102 may invoke 108 configuration system 106 at some other point (e.g., when application 102 begins running). Application 102 represents any of a variety of programs that can be run on device 100, including operating systems, productivity applications, education applications, recreational or entertainment applications, and so forth.

Multiple configuration files 104 may be available to device 100, but typically only one of the configuration files is associated with application 102. Configuration system 106 can identify which configuration file is associated with application 102 in any of a variety of manners (e.g., the configuration file may be stored in a particular location, such as a directory or folder, where executable code for application 102 also is stored; the location and name of the configuration file may be identified in a central location (e.g., an operating system registry of device 100); all configuration files may be stored in the same directory or folder but use a particular naming convention that is based on the name of application 102; and so forth). Configuration file 104 may be initially stored on a local storage device (e.g., a hard drive or flash memory) of device 100, or alternatively may be stored on a remote device (e.g., a server) and retrieved by device 100 as needed.

Configuration system 106 processes configuration file 104 and creates one or more components (also referred to as objects) 110 based on the contents of configuration file 104, the contents including definitions for the one or more components. The components that are created by configuration system 106 are instantiations of the component definitions included in configuration file 104, as discussed in more detail below. The components thus created are made available to application 102 (e.g., returned or passed to application 102, or exposed to application 102 so that application 102 can access the functionality or services of the components), which in turn can access the appropriate data and/or functionality of these components as desired.

Configuration file 104 includes various definitions, including definitions for configurable data as well as definitions for one or more configuration handlers (which can include extensible configuration handlers as well as non-extensible configuration handlers, as discussed in more detail below). The configurable data definitions define various settings and/or data values that can be configured by a user, such as a system administrator, of device 100. For each configurable data definition in configuration file 104, a configuration handler is also included in configuration file 104. A configuration handler, when invoked, is capable of creating a component based on a configurable data definition input to the configuration handler.

The configurable data definitions may be written in any of a variety of languages. For example, the configurable data definitions may be written using a markup language, such as XML (extensible Markup Language). For each such XML definition, a configuration handler can be invoked that is able to parse the XML definition and create a component from the XML definition. This created component is an instantiated object representing the XML definition. The component created by the configuration handler can then be output by configuration system 106 as a component 110.

Configuration file 104 can include extensible configuration handlers and optionally non-extensible configuration handlers. Non-extensible configuration handlers refer to configuration handlers that are designed to create components only from a limited set of configurable data definition formats (e.g., only those configurable data definition formats that are known to the handler as they have been written into (or hard-coded into) the handler and the components created by different configuration handlers have no knowledge of one another). An extensible configuration handler, however, can itself be configured to create components from user-defined configurable data definition formats, and/or can be notified of the presence of components created by different configuration handlers. Thus, only those configurable data definition formats known at the time the configuration handler is written and placed in the configuration file can be used with non-extensible configuration handlers, whereas other later-defined (and user-defined) configurable data definition formats can be used with extensible configuration handlers. As the definition formats supported by an extensible configuration handler can be customized or changed, such configuration handlers can be viewed as being extensible.

It should be noted that, although such extensible configuration handlers are extensible, they can still implement a known interface. The data format(s) that the extensible configuration handlers define for their values are extensible, as is the code that is used to read such data, but these extensions are still tied to this known interface. Thus, other components or applications need not be altered to make use of components created by such extensible configuration handlers, and configuration system 106 need not be altered to make use of the extensible configuration handlers.

Figure 2:
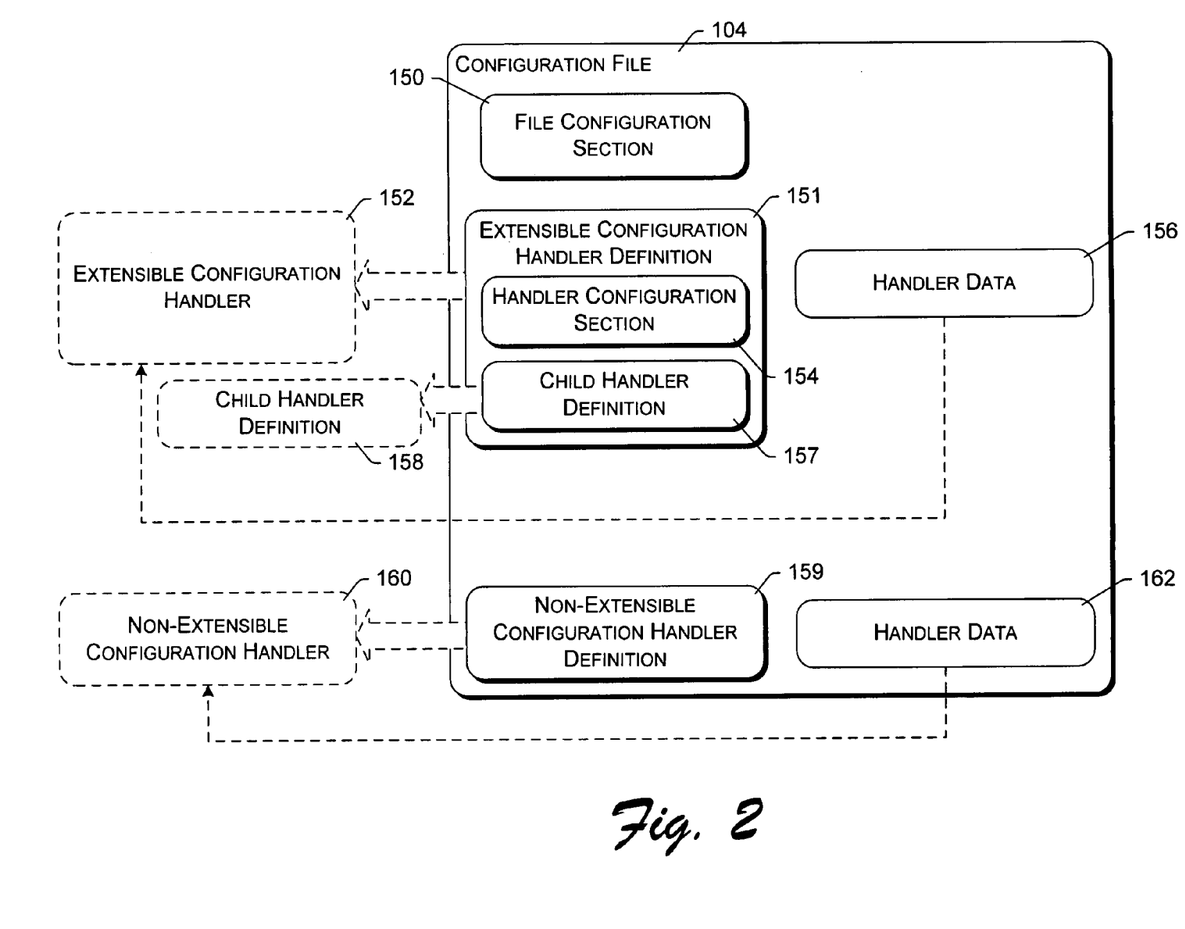
FIG. 2 illustrates an example configuration file in additional detail.

FIG. 2 illustrates an example configuration file 104 in additional detail. Configuration file 104 includes a file configuration section 150, which may also be referred to as a mapping table. File configuration section 150 includes one or more mappings of names to configuration handlers that can be used to create components. A configuration handler is a type that can be invoked and passed a component definition(s). The configuration handler in turn can parse the component definition(s) and create a component from each component definition. Accordingly, the configuration handlers are also referred to herein as types or handler types. For example, a particular mapping may be:

<name="router" type="RouterConfigHandler">

This mapping indicates that, when configuration system 106 of FIG. 1 is processing configuration file 104, if an XML tag of "router" is encountered then the XML content associated with that tag should be passed to a "RouterConfigHandler" configuration handler. A definition for the RouterConfigHandler configuration handler is also part of the configuration file 104, so configuration system 106 creates the RouterConfigHandler configuration handler (if it has not already been created), and passes the XML content associated with the "router" tag to the RouterConfigHandler configuration handler. The RouterConfigHandler configuration handler is written so that it can parse the XML content associated with the router tag. So, the RouterConfigHandler configuration handler parses the XML content it receives and returns, to configuration system 106, a component that results from the parsing of the XML content. This returned component implements a known interface and is added to a collection of components that would be invoked by the router when routing, thereby "extending" the functionality of the router.

Configuration file 104 includes an extensible configuration handler definition 151 that can be used by the configuration system 106 of FIG. 1 to instantiate an extensible configuration handler 152. Although only one extensible configuration handler definition 151 is illustrated in FIG. 2, two or more extensible configuration handler definitions may be included in configuration file 104. Extensible configuration handler definition 151 includes a handler configuration section 154 and has associated handler data 156. Handler data 156 includes the configurable data of configuration file 104 that is associated with this handler 152. For example, if extensible handler 152 were a router handler which allowed users to define their own routings, then handler data 156 would include those user-defined routings.

Extensible handler definition 151 is typically written so that handler 152 is able to understand one or more formats for handler data 156. For example, if extensible handler 152 were a router handler, definition 151 would typically be written so that handler 152 could understand one or more routing definition formats. However, in alternate embodiments, definition 151 may be written so that handler 152 does not understand any formats for handler data 156, but rather relies on the configuration handler extensibility discussed herein.

Handler configuration section 154 includes one or more mappings of names to child handlers that can be used to create components for extensible handler 152. An example child handler definition 157 is illustrated as part of configuration file 104, and can be used to instantiate a child handler component 158. Handler configuration section 154 is similar to file configuration section 150, however file configuration section 150 includes mappings of names to top-level configuration handlers within configuration file 104. A top-level configuration handler is a configuration handler that is not used by another configuration handler. Handler configuration section 154, on the other hand, includes mappings of names to child configuration handlers of configuration handler 152. A child configuration handler is a configuration handler that is used by another configuration handler.

By way of example, assume that extensible handler 152 were a router handler that understands one routing definition format. If a user, such as a system administrator, desired to define his or her own routing definition format, then the user would write a type definition 157 that describes a child handler 158 that can be created by configuration system 106, and include this type definition in configuration file 104. Although this definition 157 is illustrated in FIG. 2 as part of definition 151, definition 157 may alternatively be separate from definition 151. The user would also add a mapping in handler configuration section 154 that maps the name of this new format to this new type definition. Configuration system 106 is then able to process this new routing definition because handler 152 has been extended to have a child configuration handler 158 instantiated that knows how to process this new routing definition. When the router handler encounters an XML tag with the name of this new routing definition format, then the router handler 152 passes the XML content associated with that tag to the child handler 158 (creating the child handler if it has not already been created). The child handler 158 parses the XML content associated with the new routing definition format, and returns, to the router handler, a component that results from this parsing of the XML content. Router handler 152 can also expose child handler 158 as part of a collection of components that handler 152 exposes.

Thus, it can be seen that extensible handlers, such as handler 152, are recursive in nature. Any number of extensible handlers, analogous to handler 152, can be nested within each other, allowing each handler to be extended to understand new user-defined formats. Each such handler would include a handler configuration section analogous to section 154 that maps the names for these extensible handlers to their definitions.

Configuration file 104 can also optionally include one or more non-extensible handler definitions 159, that can be used by the configuration system 106 of FIG. 1 to instantiate a non-extensible handler 160. Handler data 162 is associated with non-extensible handler 160. Handler 160 differs from handler 152 in that handler 160 is not extensible. No handler configuration section analogous to section 154 is included in handler definition 159. Rather, handler 159 is written so that handler 160 can process certain formats for data 162, and those formats cannot be changed.

Table I includes an example of a portion of a configuration file.

TABLE I

```
1   <configuration>
2      <configSections>
3         <name="router" type="routerConfigHandler">
4         <name="dataStorage" type="dataStorageConfigHandler">
5      </configSections>
6      <router>
7         <configSections>
8            <name="myRoute" type="Router.myRouteConfigHandler">
9         </configSections>
10        <route1>
11           ...
12        </route1>
13        <myRoute>
14           ...
15        </myRoute>
16     </router>
17     <dataStorage>
18        <storage location>
19           ...
20        </storage location>
21        <format1>
22           ...
23        </format1>
24     </dataStorage>
25  </configuration>
```

In the example configuration file of Table I, line 1 defines the beginning of the configuration file while line 25 defines the end of the configuration file. Lines 2-5 are the file configuration section (e.g., file configuration section 150), which define a mapping of name "router" to a type "routerConfigHandler", and a name "dataStorage" to a type "dataStorageConfigHandler". When processing the configuration file of Table I, when the configuration system 106 of FIG. 1 encounters the router tag on line 6, it refers to the mappings of lines 2-5 and passes the content associated with the router tag (e.g., the content of lines 6-16) to the routerConfigHandler configuration handler, creating the routerConfigHandler configuration handler if necessary. In certain implementations, because this is the first time the routerConfigHandler has been accessed, the routerConfigHandler has not yet been created so the definition of the routerConfigHandler, stored elsewhere in the configuration file (not shown in Table I) is used to instantiate the routerConfigHandler configuration handler. In other implementations, each of the configuration handlers identified in the mappings of lines 2-5 (the routerConfigHandler configuration handler and the dataStorageConfigHandler configuration handler) are created when the configuration system 106 of FIG. 1 first encounters the mappings of lines 2-5 (e.g., the routerConfigHandler configuration handler is created when line 3 is first encountered, rather than waiting until another tag in the configuration file with the name "router" is encountered).

The router configuration handler is an extensible handler, so a handler configuration section on lines 7-9 is included. This configuration section on lines 7-9 defines a mapping of name "myRoute" to a type "Router.myRouteConfigHandler". The routerConfigHandler configuration handler processes the code of lines 6-16, and was written to understand the routing definition format of the route1 tag. So, the routerConfigHandler configuration handler can create a component that includes the specific routing information included in line 11 (the actual routing information has not been shown so as to avoid cluttering Table I). However, the routerConfigHandler configuration handler was not written to understand the routing definition format of the myRoute tag. So, when the router- ConfigHandler configuration handler encounters the tag myRoute in line 13, the routerConfigHandler configuration handler refers to the mappings of lines 7-9 and passes the content associated with the myRoute tag (e.g., the content of lines 13-15) to the Router.myRouteConfigHandler child configuration handler, creating the Router.myRouteConfigHandler child configuration handler if necessary. Analogous to the discussion above regarding the creation of the routerConfigHandler configuration handler, the definition of the Router.myRouteConfigHandler child configuration handler is included in the configuration file (not shown in Table I), and can be instantiated the first time the myRoute tag is encountered or alternatively when the handler configuration section on lines 7-9 is first encountered.

The Router.myRouteConfigHandler child configuration handler was written to understand the format of myRoute routing definitions. So, the Router.myRouteConfigHandler child configuration handler creates a component that includes the specific routing information included in line 14 (the actual routing information has not been shown so as to avoid cluttering Table I). The Router.myRouteConfigHandler child configuration handler then returns this component it created to the routerConfigHandler configuration handler.

The routerConfigHandler configuration handler then makes the two components (the component it created based on lines 10-12, and the component that the Router.myRouteConfigHandler child configuration handler created based on lines 13-15) available to the configuration system 106 of FIG. 1 (e.g., returns or exposes the components).

When the configuration system 106 of FIG. 1 encounters the dataStorage tag, it refers to the mappings of lines 2-5 and passes the content associated with the dataStorage tag (e.g., the content of lines 17-24) to the dataStorageConfigHandler configuration handler, creating the securityConfigHandler configuration handler if necessary (analogous to creation of the routerConfigHandler configuration handler discussed above). The dataStorageConfigHandler type is for a non-extensible handler, so no configuration section is included in lines 17-24. The dataStorageConfigHandler configuration handler processes the code of lines 17-24, and was written to understand the definition format of the storage location tag as well as the format1 tag. So, the dataStorageConfigHandler configuration handler can create a component that includes the specific storage location information included in line 19, as well as a component that includes the specific format information included in line 22 (the actual information of lines 19 and 22 has not been shown so as to avoid cluttering Table I). The dataStorageConfigHandler configuration handler then returns the two components (the component it created based on lines 18-20, and the component that it created based on lines 21-23) to the configuration system 106 of FIG. 1.

The configuration system 106 of FIG. 1 is finished processing the configuration file when it reaches line 25. The configuration system 106 of FIG. 1 then makes all four components that have been created (the component created by the routerConfigHandler configuration handler, the component created by the Router.myRouteConfigHandler child configuration handler, and the two components created by the dataStorageConfigHandler configuration handler) available to the application that invoked the configuration system. The components may be returned or passed to the application, or otherwise made available for the application to invoke the functionality exposed by the components.

Figure 3:
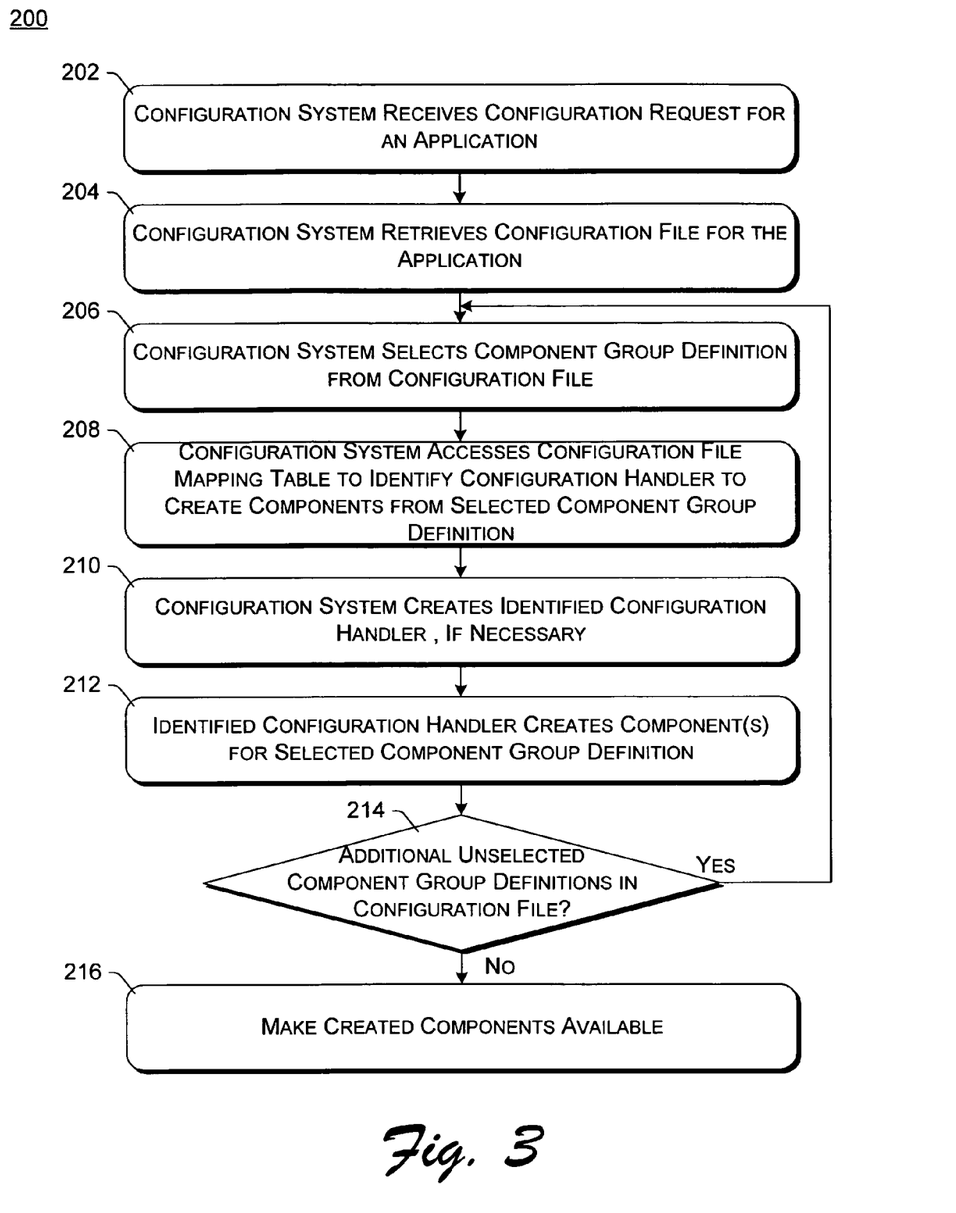
FIG. 3 is a flowchart illustrating an example process for creating components based on a configuration file.

FIG. 3 is a flowchart illustrating an example process 200 for creating components based on a configuration file. Process 200 may be performed in software, firmware, hardware, or combinations thereof.

Initially, a configuration system, such as configuration system 106 of FIG. 1, receives a configuration request for an application (act 202). This request is typically received from the application itself, but alternatively may be received from elsewhere (e.g., an operating system may submit the request for an application). The configuration system retrieves the appropriate configuration file for the application (act 204). The configuration system then selects a component group definition from the configuration file (act 206). Component group definitions are typically selected in the order in which they appear in the configuration file, although other orders could alternatively be used. This component group definition is a definition of one or more components to be created, typically by a top-level configuration handler. By way of example, referring back to the example of Table I, lines 6-16 are a component group definition for the router configuration handler (defining the one or more components to be created by the router configuration handler).

The configuration system then accesses the configuration file mapping table to identify a configuration handler to create components from the component group definition selected in act 206 (act 208). This configuration handler is the handler that will create the components defined in the selected component group definition. The configuration system then creates the identified configuration handler, if necessary (act 210). If the configuration handler has not been used before by the configuration system, then the configuration handler may not have been created yet. Thus, the configuration system creates the configuration handler if it has not been created yet, as discussed above.

The configuration handler identified in act 208 then creates the component(s) for the component group definition selected in act 206 (act 212). The creation of these component(s) is discussed in more detail below with reference to FIG. 4.

The configuration system then checks whether there are any additional component group definitions in the configuration file that have not yet been selected (act 214). If there are such component group definitions, then process 200 returns to act 206 where one such component group definition is selected. However, if there are no such component group definitions, then the configuration system makes the components that were created in act 212 (act 216) available. These components are typically returned or otherwise made available to the application. For example, the configuration system may pass the components back to the application, or may simply expose the components so that they can be invoked by the application. Alternatively, these components may be returned or otherwise made available elsewhere (e.g., to whatever component sent the configuration request in act 202).

Figure 4:
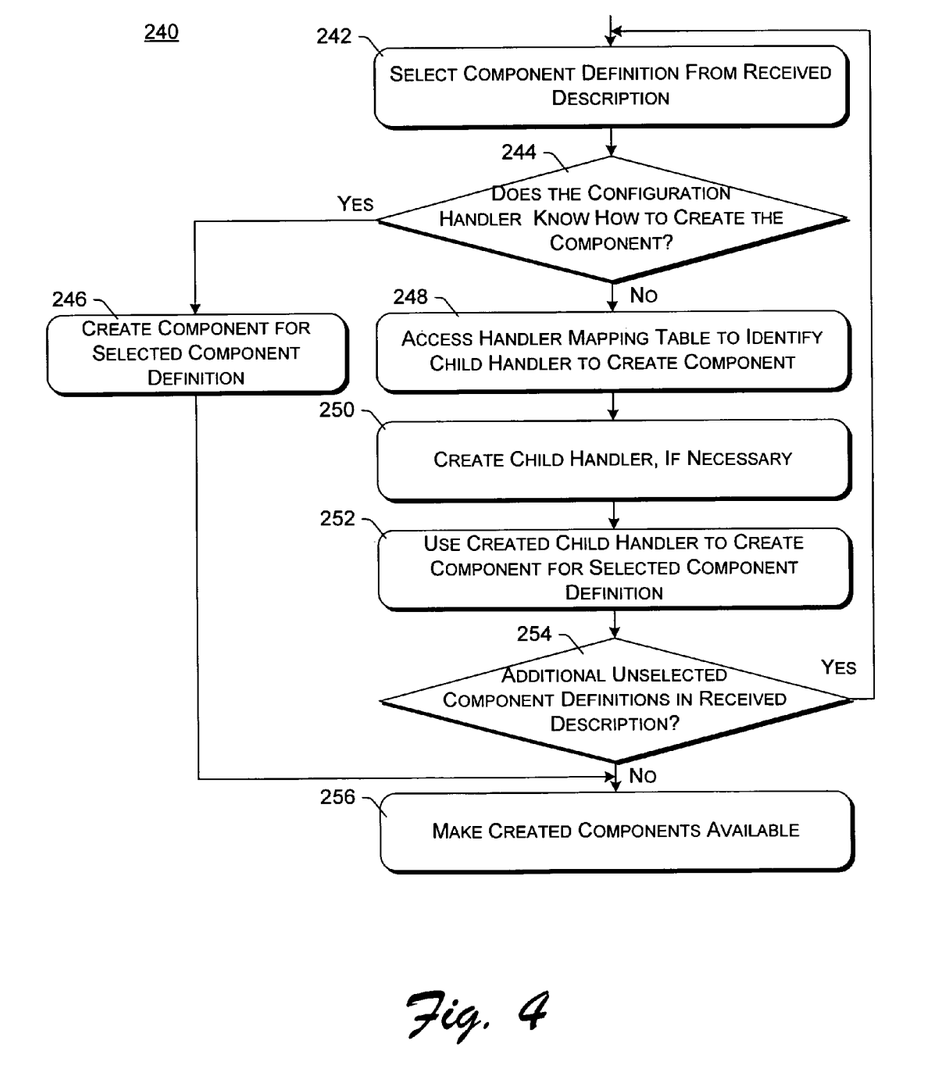
FIG. 4 is a flowchart illustrating an example process for creating components based on a definition.

FIG. 4 is a flowchart illustrating an example process 240 for creating components based on a definition. Process 240 may be performed in software, firmware, hardware, or combinations thereof. Process 240 is carried out by a configuration handler. Process 240 describes certain embodiments of act 212 of FIG. 3 in additional detail.

Initially, a component definition from a component group definition passed to the configuration handler is selected (act 242). The configuration handler typically selects component definitions in the order in which they appear in the component group definition, although other orders could alternatively be used. This component definition is a definition of a component to be created. By way of example, referring back to the example of Table I, lines 13-15 are a component definition for the myRoute routing definition.

A check is then made as to whether the configuration handler knows how to create the component using the selected component definition (act 244). The configuration handler knows how to create the component if it was written to know how to create the component (e.g., if it was written to parse the format of the component definition). If the configuration handler knows how to create the component, then it creates the component for the selected component definition (act 246).

However, if the configuration handler does not know how to create the component, then it accesses a handler mapping table to identify a child handler to create the component (act 248). The handler then creates the child handler, if necessary (act 250). If the child handler has not been used before by the configuration system, then the child handler may not have been created yet. Thus, the handler creates the child handler if it has not been created yet, as discussed above.

The child handler is then used to create a component for the selected component definition (act 252). The child handler may be written such that it knows how to parse the component definition itself, and thus can create the component without any additional configuration handlers being involved in the process. Alternatively, there may be one or more definitions in the component definition which the child handler cannot parse, and thus process 240 may be repeated for the child handler. When the process 240 is repeated, the child handler is referred to as the handler as discussed in process 240, and it creates another child handler (if necessary) in act 250.

When the component is created, a check is then made as to whether there are any additional component definitions in the group that have not yet been selected (act 254). If there are such component definitions, then process 240 returns to act 242 where one such component definition is selected. However, if there are no such component definitions, then the configuration handler makes the components that were created in act 252 (act 256) available (e.g., returns or exposes the components). These components are typically returned or otherwise made available to the configuration handler from which the group of component definitions was received. Alternatively, these components may be returned or otherwise made available elsewhere.

Thus, as can be seen from FIGS. 3 and 4, any number of configuration handlers can be nested (e.g., a configuration handler may include a child configuration handler, which in turn includes a child configuration handler, which in turn includes a child configuration handler, and so on). At each level of nesting, there is a parent configuration handler that invokes a child configuration handler to assist in the processing of the data (e.g., the XML component definition). Process 240 is used recursively to process the configuration handlers.

The child configuration handler is also passed in the instantiation of the parent component (the "parent instance",) which the child configuration handler can interact with. This allows the child configuration handler to access the interfaces of the parent instance, and thus allows the child configuration handler to add components to a collection of components. For example, for <myRoute> in Table I, the myRouteConfigurationHandler would get passed the instance of the router, which it would then use to do, for example: router.Routes.Add(new MyRoute("configuration-values-that-were-read")) in order to add the MyRoute component to the instance of the router.

The above discussion of FIGS. 3 and 4 assumes that there are no errors in the component definitions and that a configuration handler (top-level or child) is always available (identified in a configuration section as appropriate) to generate components as needed. In situations where an error is encountered (e.g., an XML tag is encountered and there is no mapping for that tag in a configuration section), then the configuration process fails. The entire configuration process may fail (e.g., configuration system 106 of FIG. 1 returns an error but does not return or expose any), or alternatively only the creation of the affected components may fail (e.g., the component(s) for which there is no mapped configuration handler is not created, but other components for which there is a mapped configuration handler are created).

Returning to FIG. 1, an additional aspect of the extensible configuration handlers discussed herein is that the various components 110 made available by configuration system, 106 may, in some situations, desire to access the functionality of one another. By way of example, some components 110 may be related to router functionality, while other components 110 may be related to security functionality. It may be the situation that some of the router components 110 may desire to implement some security features by accessing functionality of the security component 110. The extensible configuration handlers facilitate such accessing across components 110 by notifying the various components 110 of one another, as discussed in more detail below.

Figure 5:
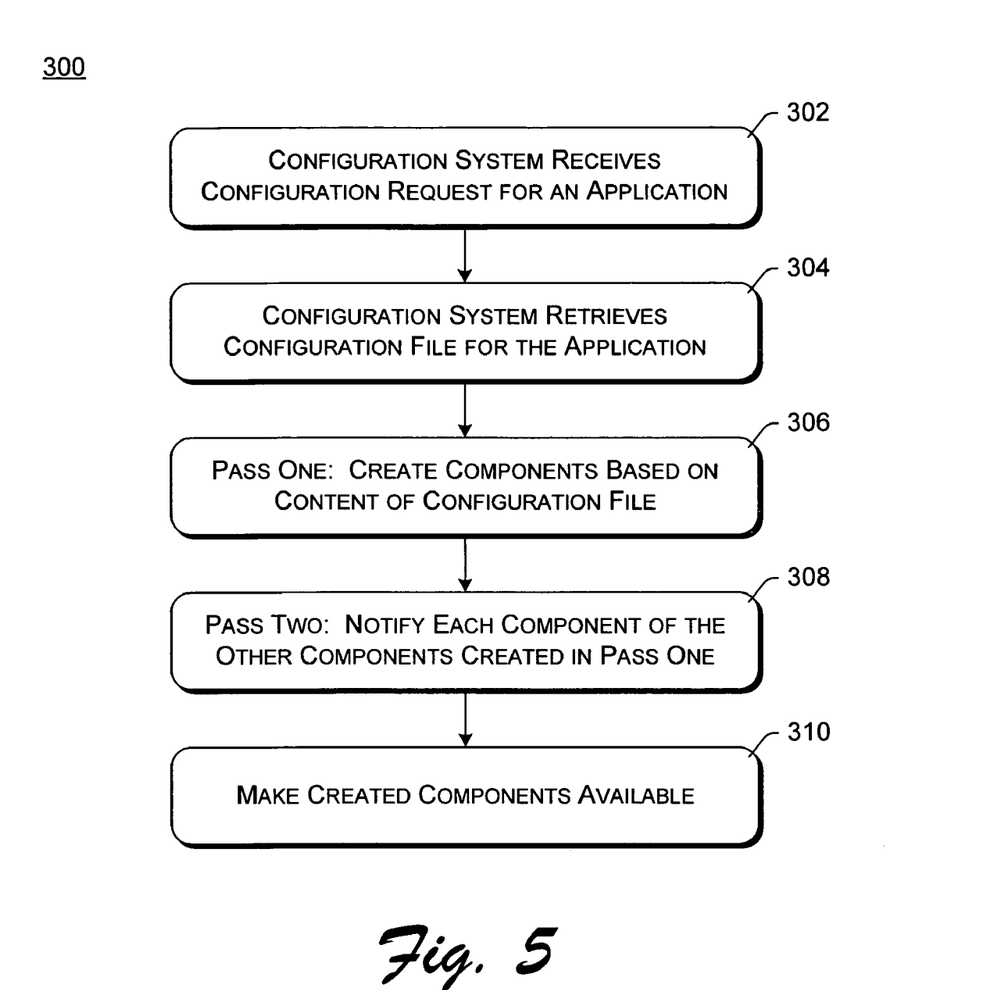
FIG. 5 is a flowchart illustrating an example process for allowing components to access one another.

FIG. 5 is a flowchart illustrating an example process 300 for allowing components to access one another. The process of FIG. 5 may be performed in software, hardware, firmware, or combinations thereof.

Initially, the configuration system receives a configuration request for an application (act 302), analogous to act 202 of FIG. 3. The configuration system then retrieves a configuration file for the application (act 304), analogous to act 204 of FIG. 3.

One or more components are then created based on extensible handler content of the configuration file (act 306). These components can be created as discussed above (e.g., with reference to acts 206-214 of FIG. 3). This creation of the components is also referred to as a first pass or first phase. After the components are created, each component created by an extensible configuration handler is then notified of the presence of the other components that were created in act 306 (act 308). What the components do with this information they receive is up to them (e.g., a component can ignore the information if it does not care about the information, or alternatively use the information for those components whose services it desires to access). This notification can take a variety of different forms, and in certain embodiments is performed by invoking a method exposed by the created components (e.g., referred to as a WireUp method). A parameter of this method is the created components or an identification of the created components (e.g., a list or other set of identifiers of the components, a location where such a list or other set of identifiers can be obtained, and so forth). This notification of the components of the existence of one another is also referred to as a second pass or second phase.

In certain embodiments, this notification is performed by each top-level configuration handler invoking a method exposed by each component created by that top-level configuration handler as well as each component created by any other configuration handler nested within that top-level configuration handler. In other embodiments, this notification can be performed by something other than the top-level configuration handlers, such as by configuration system 106.

When both passes or phases are finished, the components are made available (act 310), analogous to act 216 of FIG. 3. Thus, as can be seen from FIG. 5, the components created and made available (e.g., returns or exposes the components) by the two-pass or two-phase process of FIG. 5 are aware of one another and can access the services or functionality of one another as they desire.

Table II includes another example of a portion of a configuration file. The portion illustrated in Table II is similar to the portion included in Table I discussed above, however in Table II the content associated with the router tag (lines 6-16 of Table I) is part of content associated with a system tag.

TABLE II

```
1    <configuration>
2      <configSections>
3        <name="system" type="systemConfigHandler">
4        <name="dataStorage" type="dataStorageConfigHandler">
5      </configSections>
6      <system>
7        <configSections>
8          <name="router" type="System.routerConfigHandler">
9          <name="security" type="System.securityConfigHandler">
10       </configSections>
11       <router>
12         <configSections>
13           <name="myRoute" type=
                "System.Router.myRouteConfigHandler">
14         </configSections>
15         <route1>
16           ...
17         </route1>
18         <myRoute>
19           ...
20         </myRoute>
21       </router>
22       <security>
23         ...
24       </security>
25     </system>
26     <dataStorage>
27       <storage location>
28         ...
29       </storage location>
30       <format1>
31         ...
32       </format1>
33     </dataStorage>
34   </configuration>
```

Referring back to FIG. 1 and the example of Table II, during the first pass when the configuration system 106 encounters the system tag in line 6, it refers to the mappings of lines 2-5 and passes the content associated with the system tag (e.g., the content of lines 6-25) to the systemConfigHandler configuration handler, creating the systemConfigHandler configuration handler if necessary. When the systemConfigHandler configuration handler encounters the router tag in line 11, it refers to the mappings of lines 7-10 and passes the content associated with the router tag (e.g., the content of lines 11-21) to the System.routerConfigHandler configuration handler, creating the System.routerConfigHandler configuration handler if necessary. When the System.routerConfigHandler configuration handler encounters the tag myRoute in line 18, the System.routerConfigHandler configuration handler refers to the mappings of lines 12-14 and passes the content associated with the myRoute tag (e.g., the content of lines 18-20) to the System.Router.myRouteConfigHandler configuration handler, creating the System.Router.myRouteConfigHandler configuration handler if necessary.

During the second pass, the systemConfigHandler configuration handler invokes method on the components created by the System.routerConfigHandler configuration handler, components created by the System.securityConfigHandler configuration handler, and components created by the System.Router.myRouteConfigHandler. When invoking each of these methods, the systemConfigHandler configuration handler identifies (e.g., as a parameter to the methods), the components that were created by the System.routerConfigHandler configuration handler, the System.securityConfigHandler configuration handler, and the System.Router.myRouteConfigHandler.

It should be noted that in certain situations, depending on the nature of the configuration handlers, the two-pass process described in FIG. 5 may not be used. Rather, the notification of components may be performed as part of the component creation process (e.g., described with reference to FIGS. 3 and 4). For example, if some of the created components implement router functionality and others implement security functionality, it may be the situation that some of the router components may desire to implement some security features by accessing functionality of the security components, but that the security components do not desire to access any functionality of the router components. Thus, so long as the security components were created prior to the router components being created, then the created security components could be identified and incorporated into the router components when the router components are being created by the router configuration handler.

In certain embodiments, each component created by an extensible configuration handler exposes a method that can be invoked during the second pass (act 308 of FIG. 5) to notify that component of the other components that have been created. This method has a parameter which is the collection of components that were created during the first pass.

One example environment where the extensible configuration handlers discussed herein can be used is in a message bus environment. A message bus environment refers to a messaging framework that allows components on the same or different computing devices to pass data among one another. Some of these components will typically include routing functionality to route data (e.g., data packets) from one device to another.

The following is an example Application Programming Interface (API) which can be used to implement various aspects of the extensible configuration handlers discussed herein. Although discussed with reference to a message bus, it is to be appreciated that analogous APIs can be generated for use with other environments. The example API includes the following four APIs:

(1) MessageBusConfiguration
(2) MessageBusConfigSectionHandler
(3) MessageBusConfigHandlerBase
(4) HandlerTable.

Additional information describing these four APIs follows.

(1) MessageBusConfiguration
public class MessageBusConfiguration: CollectionBase
Namespace: System.MessageBus
Assembly: System.Messagebus

| Constructors |
|---|
| public MessageBusConfiguration( ); |

Constructs a default/empty configuration loader.

| Properties |
|---|
| public object this[int index] {get; set;}<br>public object this[Type type] {get; set;} |

Methods to access an object created from the configuration file using the appropriate handler. Access is based on the index of the object in a list or the type of the object being created. Alternatively, access could be based on any other identifier of the object.

| Methods |
|---|
| public int Add(object item);<br>Parameters<br>  item: System.Object<br>Adds an object to the collection of configuration objects.<br>public bool Contains(object item);<br>Parameters<br>  item: System.Object<br>Returns a value indicating whether an identified object is included in a collection of objects.<br>public void CopyTo(object[ ] array, int index);<br>Parameters<br>  array: System.Object[ ]<br>  index: System.Int32<br>In a collection of objects, copies an object to a particular location (index) in a list of the objects.<br>public static MessageBusConfiguration GetFromConfig( );<br>This method loads all the objects from the MessageBus section of the configuration file. Users of the MessageBus call this method to initiate the two-pass configuration loading defined in the rest of this document.<br>public int IndexOf(object item);<br>Parameters<br>  item: System.Object<br>Returns the location (index) in a list of the identified object.<br>public void Insert(int index, object item);<br>Parameters<br>  index: System.Int32<br>  item: System.Object<br>Allows an object to be added to a particular location (index) in a list of a collection of objects.<br>protected override void OnValidate(object value);<br>Parameters<br>  value: System.Object<br>Validates that only 1 object of a particular type is added to the collection of configuration objects. E.g.—Only 1 router can be added to the configuration system. If there are more than 1 then anybody who wants to use the router won't know which one to use.<br>public void Remove(object item);<br>Parameters<br>  item: System.Object<br>Deletes an object from a collection of objects. |

(2) IMessageBusConfigSectionHandler public interface IMessageBusConfigSectionHandler:

IConfigurationSectionHandler

Namespace: System.MessageBus.Configuration

Assembly: System.Messagebus

This is the interface that any handler that wants to participate in the extensible part of the configuration system implements. It inherits from the non-extensible interface IConfigurationSectionHandler (which allows non-extensible configuration handlers to be created) and adds the entry point for the 2$^{nd}$ pass called WireUp.

| Methods |
|---|
| void WireUp(MessageBusConfiguration messageBusConfiguration);<br>Wire up the various components created by config.<br>Parameters<br>  messageBusConfiguration:<br>System.MessageBus.MessageBusConfiguration<br>This method is called during the 2$^{nd}$ phase of configuration building. The Wireup method on each component is called and the list of components is passed in as the parameter to the call. This way the component being wired up has access to all other components in the system and can chose which ones it needs to do its functionality. |

(3) MessageBusSectionHandlerBase public class MessageBusSectionHandlerBase:

IMessageBusConfigSectionHandler,

IConfigurationSectionHandler

MessageBusSectionHandlerBase—wrapper for IMessageBusConfigSectionHandler. This implements a base class for storing and parsing an XMLNode Config object (a node in the XML document defining a configuration handler). This is a utility class to help implement extensible configuration handlers. The class implements basic XML parsing and the logic for recursively invoking child handlers.

Namespace: System.MessageBus.Configuration

Assembly: System.Messagebus

| Constructors |
|---|
| public MessageBusSectionHandlerBase( ); |

| Properties |
|---|
| protected virtual string AddElementName {get;}<br>Xml element that is used to initiate an add.<br>protected virtual string ClearElementName {get;}<br>Xml element that is used to initiate a clear. Clear removes all previously defined entries. So, if this element was encountered in, for example, a routing table, it would remove all previously added routes.<br>protected HandlerTable HandlerTable {get;}<br>This is the list of child handlers that can be invoked to handle unrecognized XML tags.<br>protected virtual string KeyAttributeName {get;}<br>Make the name of the key attribute configurable by derived classes<br>protected virtual MessageBusConfiguration ParentConfiguration {get;}<br>Pointer to the parent configuration. For example, for a routing rule this points to the router.<br>protected virtual string RemoveElementName {get;}<br>Xml element used to initiate a remove.<br>protected virtual string ValueAttributeName {get;}<br>Make the name of the value attribute configurable by derived classes |

| Methods |
|---|
| protected virtual void Add(string key, string value);<br>  Add - Adds/Updates the collection<br>Parameters<br>  key: System.String<br>  value: System.String<br>protected virtual void Clear( );<br>Clear the internal collection<br>protected virtual void Create(object parent, object |

-continued

| Methods |
|---|
| createContext);<br>Creates an internal representation of the collection object being implemented<br>Parameters<br>  parent: System.Object<br>  createContext: System.Object<br>public virtual object Create(object parent, object configContext, XmlNode section);<br>Given a partially composed config object (possibly null)and some input from the config system, return a further partially composed config object<br>Parameters<br>  parent: System.Object<br>  configContext: System.Object<br>  section: System.Xml.XmlNode<br>Return Value<br>  The object created as a result of this config section<br>protected virtual object Get( );<br>called before returning to Configuration code, used to generate the output collection object<br>protected virtual void OnCreateChildObject(object child);<br>Handle the creation of a child object<br>Parameters<br>  child: System.Object<br>protected virtual void OnProcessChildElement(XmlNode element);<br>Process an XML Node that wasn't handled by the other config handlers.<br>Parameters<br>  element: System.Xml.XmlNode<br>protected virtual void Remove(string key);<br>Removes the specified key from the collection<br>Parameters<br>  key: System.String<br>protected virtual void WalkXmlNodeList(object parent, object configContext, XmlNode section);<br>Walks list of XML nodes, and processes them by calling Add, Clear, Remove to cause them to update the config object we are processing<br>Parameters<br>  parent: System.Object<br>  configContext: System.Object<br>  section: System.Xml.XmlNode<br>public virtual void WireUp(MessageBusConfiguration configuration);<br>Parameters<br>  configuration: System.MessageBus.MessageBusConfiguration<br>2$^{nd}$ stage of processing. |

(4) HandlerTable public class HandlerTable

Namespace: System.MessageBus.Configuration

Assembly: System.Messagebus

This class implements the mapping from tag to the handler for that class.

| Constructors |
|---|
| public HandlerTable( ); |

| Properties |
|---|
| public IMessageBusConfigSectionHandler this[string tagName] {get;}<br>Get the handler for this given tag.<br>public ICollection Values {get;} |

| Methods |
|---|
| public void Add(string tagName, IMessageBusConfigSectionHandler handler);<br>Parameters<br>  tagName: System.String<br>  handler:<br>    System.MessageBus.Configuration.IMessageBusConfigSectionHandler<br>Add a mapping from a tag to a handler class.<br>public void Clear( );<br>Delete all tag-handler mapping.<br>public void Remove(string tagName);<br>Parameters<br>  tagName: System.String<br>Remove a particular tag-handler mapping. |

Figure 6:
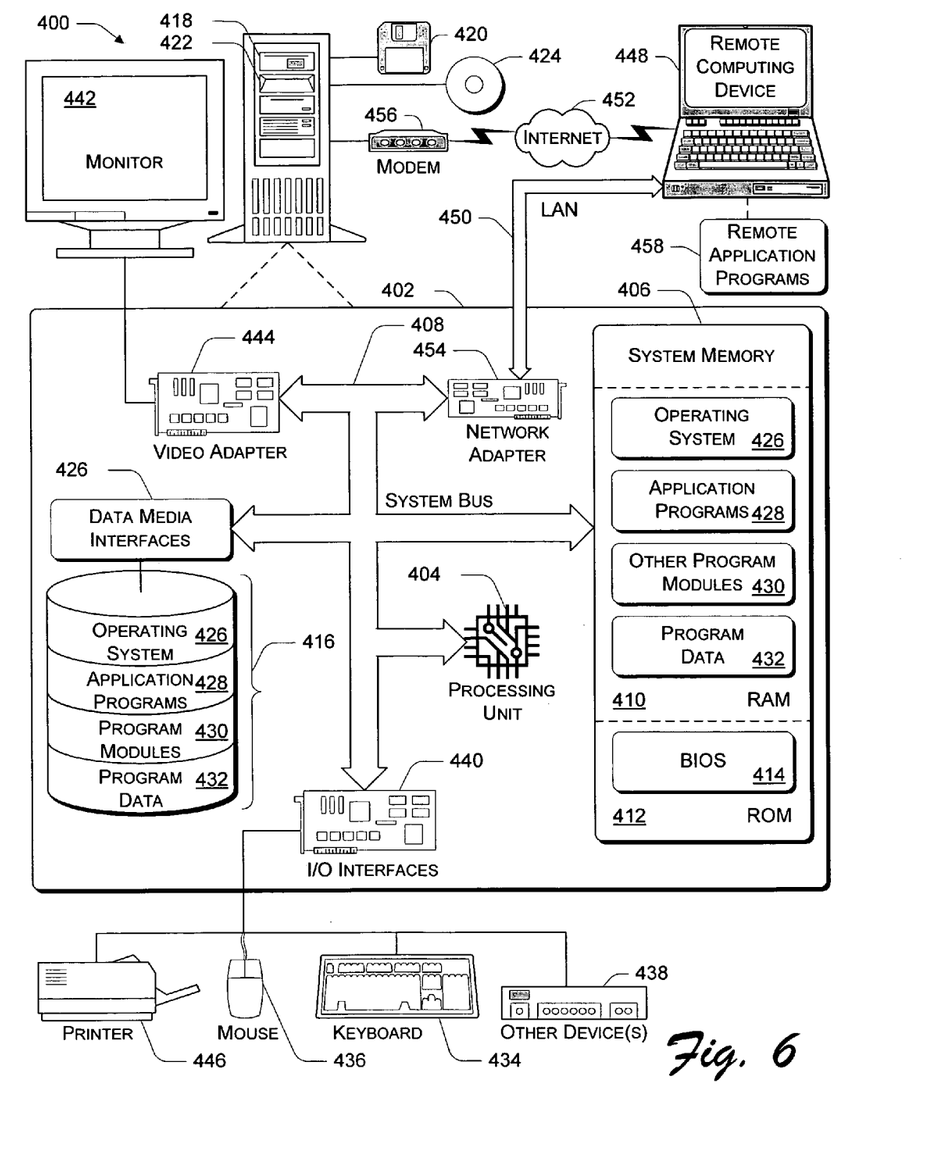
FIG. 6 illustrates an example of a general computer environment.

FIG. 6 illustrates an example of a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the example computer environment 400.

Computer environment 400 includes a general-purpose computing device in the form of a computer 402. Computer 402 can be, for example, a device 100 of FIG. 1. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 6 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are examples and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

One or more flowcharts are described herein and illustrated in the accompanying Figures. The ordering of acts in these flowchart(s) are examples only—these orderings can be changed so that the acts are performed in different orders and/or concurrently.

Although the description above uses language that is specific to structural features and/or methodological acts, it is to be understood that the invention defined in the appended claims is not limited to the specific features or acts described.

Rather, the specific features and acts are disclosed as exemplary forms of implementing the invention.

The invention claimed is:

1. One or more computer storage readable media having stored thereon a plurality of instructions that, when executed by one or more processors, causes the one or more processors to:

access a configuration file written in a markup language and associated with an application, the configuration file having definitions of a plurality of configuration handlers for creating handler components based on a mapping table defined in the configuration file, at least one of the plurality of configuration handler definitions including a definition of a first configuration handler, the first configuration handler being configured to create a first handler component based on the mapping table and further comprising a second configuration handler nested within the first configuration handler, the second configuration handler being configured to create a second handler component based on a mapping definition in a configuration section within the first configuration handler, wherein the second configuration handler is user-defined to handle a customized handler data that is not supported by the first configuration handler, and wherein the second handler component created by the second configuration handler implements a known interface such that the data defined by the second configuration handler is properly processed by the application without alteration to the application;

create the plurality of handler components including the first handler component and the second handler component in accordance with the definitions;

inform one or more of the plurality of handler components of the presence of other handler components; and make the plurality of handler components available to the application.

2. One or more computer storage readable media as recited in claim 1, each of the plurality of configuration handler definitions being written in an extensible Markup Language (XML) format.

3. One or more computer storage readable media as recited in claim 1, wherein to inform each of the plurality of handler components of the other handler components is to invoke a method exposed by one or more of the plurality of handler components.

4. One or more computer storage readable media as recited in claim 3, wherein to invoke the method exposed by one or more of the plurality of handler components is further to include, as a parameter of the method, an identification of the plurality of handler components.

5. One or more computer storage readable media as recited in claim 3, wherein the method comprises a WireUp method.

6. One or more computer storage readable media as recited in claim 1, wherein the plurality of instructions, when executed by the one or more processors, further cause the one or more processors to implement nested configuration handlers defined in the configuration file.

7. A method of using a configuration file to generate one or more handler components that are accessible to an application, the method comprising:

creating, in a first phase, a plurality of handler components defined in a configuration file, the creating comprising creating at least a first handler component based on a first configuration handler and a second handler component based on a second configuration handler, the second configuration handler being configured to nest within the first configuration handler, wherein the second handler component is user-defined to handle a customized handler data that is not supported by the first configuration handler, and wherein the second handler component implements a known interface such that the data defined by the second configuration handler is properly processed by the application without alteration to the application; and notifying, in a second phase, one or more of the plurality of handler components of the presence of the other handler components.

8. A method as recited in claim 7, the creating comprising:

obtaining, from the configuration file, definitions for each of the plurality of handler components;

identifying, from the configuration file, a configuration handler to be used to create one handler component of the plurality of handler components based on one of the definitions; and while creating the one component, identifying, from the configuration file, a child configuration handler to be used to create another handler component to be used by the one handler component.

9. A method as recited in claim 7, the notifying comprising:

invoking a method exposed by each of the one or more of the plurality of handler components.

10. A method as recited in claim 9, the invoking comprising:

passing, as a parameter of the method, an identification of the plurality of handler components.

11. One or more computer storage readable media having stored thereon a plurality of instructions that, when executed by one or more processors, causes the one or more processors to access a configuration file and create a plurality of handler components including at least a first and a second handler component based on a first and a second configuration handler define in the configuration file associated with an application, the first configuration handler and mapping the second configuration handler in a configuration section nested within the first configuration handler, wherein:

the second configuration handler is user-defined to handle a customized handler data that is not supported by the first configuration handler;

the second handler component created by the second configuration handler implements a known interface such that the data defined by the second configuration handler is properly processed by the application without alteration to the application; and the first and the second handler components, upon creation, are notified of a presence of one or more of the plurality of handler components that have been previously created.

12. A method comprising:

receiving a request to create a plurality of components from a configuration file associated with an application;

obtaining, from the configuration file, definitions for each of the plurality of handler components;

identifying, from the configuration file, a configuration handler to be used to create one component of the plurality of components based on one of the definitions;

while creating the one handler component, identifying, from the configuration handler, a child configuration handler to be used to create another handler component to be used by the one component, wherein the child configuration handler is nested within the configuration handler, wherein the child configuration handler is user-defined to handle a customized handler data that is not supported by the configuration handler, and wherein the other handler component created by the child configuration handler implements a known interface such that the data defined by the child configuration handler is property processed by the application without alteration to the application;

notifying one or more of the plurality of handler components of the presence of the other handler component; and making the plurality of handler components available to the application.

13. A method as recited in claim 12, the identifying, from the configuration file, a child configuration handler comprising:

accessing a configuration section in the identified configuration handler, the configuration section mapping component identifiers to child configuration handlers; and locating, from the mapping, the child configuration handler based on an identifier of the other component.

14. A method as recited in claim 13, the identifier of the other component comprising an eXtensible Markup Language (XML) tag.

15. A method as recited in claim 12, the definitions for each of the plurality of handler components being written in an eXtensible Markup Language (XML) format.

16. A method as recited in claim 12, the identifying comprising:

identifying a tag associated with a definition of the one handler component;

accessing a mapping of tags to configuration handlers in the configuration file; and identifying, using the mapping and based on the identified tag, the configuration handler to be used to create the one handler component.

17. A method as recited in claim 16, the identifying from the configuration file, a child configuration handler comprising:

accessing a configuration section in the identified configuration handler, the configuration section mapping component identifiers to child configuration handlers; and locating, from the mapping, the child configuration handler based on an identifier of the other component.

18. A system comprising:

a processor;

an application; and a configuration system to access a configuration file associated with the application, the configuration file storing one or more extensible configuration handlers, the configuration system to create a plurality of handler components for the application in a two-phase process, the first phase including:

obtaining, from the configuration file, definitions for each of the plurality of handler components;

identifying, from the configuration file, a configuration handler to be used to create one handler component of the plurality of handler components based on one of the definitions; and while creating the one handler component, identifying, from the one of the definitions, a child configuration handler to be used to create another handler component to be used by the one component the child configuration handler being configured to nest in the definition of the one handler component, wherein the child configuration handler is user-defined to handle a customized handler data that is not supported by the configuration handler, and wherein the other handler component created by the child configuration handler implements a known interface such that the data defined by the child configuration handler is properly processed by the application without alteration to the application; and the second phase including:

notifying one or more of the plurality of components of the presence of the other components in the plurality of components.

19. A system as recited in claim 18, the notifying comprising:

invoking a method exposed by the one or more of the plurality of handler components, and passing, as part of the invoking, the plurality of handler components as a parameter of the method.

* * * * *